United States Patent [19]

Ching

[11] 4,395,461

[45] Jul. 26, 1983

[54] METHOD FOR MAKING SILICON COATED POLYCARBONATES AND ARTICLE OBTAINED THEREFROM

[75] Inventor: Ta-Yen Ching, Schenectady, N.Y.

[73] Assignee: General Electric Company, Schenectady, N.Y.

[21] Appl. No.: 314,165

[22] Filed: Oct. 23, 1981

[51] Int. Cl.$^3$ .................. C08L 83/12; C09K 9/00; B32B 27/36; B05D 3/02

[52] U.S. Cl. .................. 428/412; 106/287.12; 106/287.16; 427/322; 427/379; 427/387; 427/412.1; 428/447; 524/506; 524/858; 428/448

[58] Field of Search ............ 427/322, 387, 379, 412.1; 428/412, 447, 448; 106/287.12, 287.16; 524/506, 858

[56] References Cited

U.S. PATENT DOCUMENTS

| | | | |
|---|---|---|---|
| 4,242,381 | 12/1980 | Gooseens et al. | 428/412 X |
| 4,278,804 | 7/1981 | Ashby et al. | 428/412 X |
| 4,299,746 | 11/1981 | Frye | 106/287.12 |

*Primary Examiner*—Michael R. Lusignan
*Attorney, Agent, or Firm*—William A. Teoli; James C. Davis, Jr.; James Magee, Jr.

[57] ABSTRACT

A method is provided for improving the weatherability of a polycarbonate substrate by initially treating the surface of the polycarbonate substrate with a solution of a hydrolyzed silylated organic U.V. screen followed by the application of a curable silicone hardcoat composition onto the treated substrate.

5 Claims, No Drawings

METHOD FOR MAKING SILICON COATED POLYCARBONATES AND ARTICLE OBTAINED THEREFROM

CROSS REFERENCE TO RELATED APPLICATIONS

Reference is made to copending application of Howard A. Vaughn, Ser. No. 964,910, filed Nov. 30, 1978, for "Silicon Resin Composition", and to my applications Ser. No. 154,623, now U.S. Pat. No. 4,373,060, patened Feb. 8, 1983, for "Silicone Coating for Unprimed Plastic Substrate and Coated Articles", and Ser. No. 154,624, now U.S. Pat. No. 4,373,061, patented Feb. 8, 1983, filed May 30, 1980, where all of the aforementioned applications are assigned to the same assignee as the present invention.

BACKGROUND OF THE INVENTION

This invention relates to a method for applying a protective coating composition onto a polycarbonate substrate and to articles obtained therefrom. More particularly, it relates to the initial treatment of a polycarbonate substrate with a hydrolyzed silylated organic UV screen, followed by the application of a protective abrasion-resistant coating thereon.

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses, such as for eyeglasses and other optical instruments, as well as glazing for large buildings, also employ shatter-resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering than glass, a serious drawback lies in the ease with which these plastics mar and scratch, due to everyday contact with abrasives, such as dust, cleaning equipment and ordinary weathering, Continuous scratching and marring results in impaired visibility and poor aesthetics, and oftentimes requires replacement of the glazing or lens or the like.

One of the most promising and widely used transparent plastics for glazing is polycarbonate, such as that known as Lexan® polycarbonate, sold by General Electric Company. It is a tough material, having high impact strength, high heat deflection temperature, good dimensional stability, as well as being self-extinguishing, and is easily fabricated.

Attempts have been made to improve the abrasion resistance of transparent plastics. For example, scratch-resistant coatings formed from mixtures of silica, such as colloidal silica or silica gel, and hydrolyzable silanes in a hydrolysis medium, such as alcohol and water, are known. U.S. Pat. Nos. 3,708,225, 3,986,997 and 3,976,497, for example, describe such compositions.

Copending U.S. application entitled "Silicone Resin Coating Composition", by However A. Vaughn Ser. No. 964,910) discloses another abrasion-resistant coating composition. This coating composition has been found to be highly desirable as a protective finish for plastic, as well as metal or metallized substrates. A particularly significant area of application for this Vaughn coating is in the glazing and optical lens industry. Since these areas required a coating of high optical clarity, coatings which show flowmarks, dirtmarks, or other marks which may impair visibility are undesirable. It was further found, as shown by Frye, U.S. Pat. No. 4,277,287, assigned to the same assignee as the present invention that the addition of a small amount of a polysiloxane polyether copolymer to the coating compositions disclosed in the aforementioned Vaughn application eliminates the occurrence of the undesirable flowmarks and the like, as well as providing other improvements in the hard coating.

As shown in my copending application Ser. Nos. 154,623 and 154,624, improved weatherability of the resulting polycarbonate composites were achieved by application of the above silicone hardcoat compositions by incorporating silylated UV screen as defined hereinafter into the silicone hardcoat prior to its application onto the polycarbonate substrate.

The present invention is based on the discovery that improved weatherability of polycarbonate substrates having protective silicone hardcoats on at least a portion of the surface of such polycarbonate substrate can be achieved if silylated UV screens are initially applied directly onto the polycarbonate substrate as a hydrolysis product prior to the application of the silicone hardcoat composition. Prior to the present invention, the weathering barrier was limited to about 600–700 hours of accelerated weathering shown by a QUV device sold by the Q-Panel Company, of Cleveland, Ohio. It was found that by directly treating the polycarbonate substrate with silylated organic UV screen hydrolysis product, in accordance with the practice of the invention, followed by the application of the hardcoat composition, the accelerated QUV weathering barrier was enhanced to 1400 hours.

STATEMENT OF THE INVENTION

There is provided by the present invention a method for making a composite of a polycarbonate substrate and a silicone hardcoat having improved weatherability which comprises, (1) treating a polycarbonate substrate with a solution of a silylated organic UV screen hydrolysis product and curing the applied hydrolyzate on the treated substrate at a temperature of from 75° C. to 150° C. and (2) applying onto the treated polycarbonate substrate a silicone hardcoat composition and thereafter heating the resulting composite to a temperature in the range of from 75° C. to 150° C. until the applied hardcoat composition is cured.

Some of the silylated UV screens which can be used in the practice of the present invention have the formula,

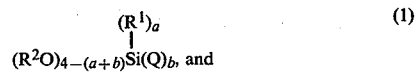

$$(R^2O)_{4-(a+b)}Si(Q)_b, \text{ and} \quad (1)$$

with $(R^1)_a$ above the Si, where $R^1$ is a $C_{(1-13)}$ monovalent hydrocarbon radical or substituted monovalent hydrocarbon radical, $R^2$ is a $C_{(1-8)}$ aliphatic organic radical selected from alkyl radicals, alkyl ether radicals, alkyl ester radicals, alkyl ketone radicals, alkylene radicals and $C_{(7-13)}$ aralkyl radicals, Q is selected from (i) 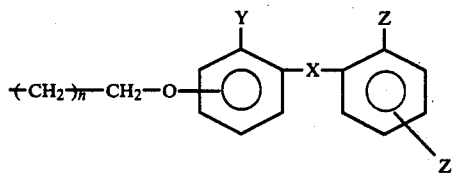

(ii) 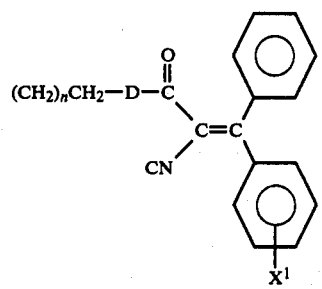

(iii) 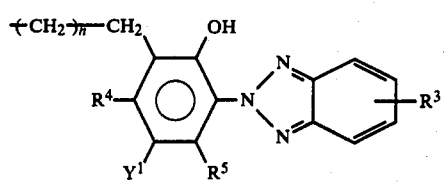

(iv) 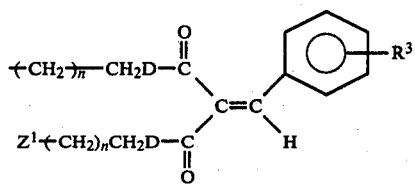

Y is H or OH, Z is H, OH, $OQ^1$ or OM, where at least one Z is OH if Y is H, M is $C_mH_{2m+1}$ and m is an integer equal to 1 to 18 inclusive, X is selected from

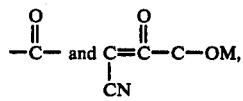

$R^3$ is a member selected from the class consisting of hydrogen, $C_{(1-8)}$ alkoxy, carboxy, halogen, hydroxy, amino, carbethoxy and $D-CH_2(CH_2)_nSi(OR^2)_3$, $R^4$ is a member selected from the class consisting of hydrogen, halogen, hydroxy, $C_{(1-8)}$ alkyl and $C_{(1-8)}$ alkoxy, $R^5$ is a member selected from the class consisting of hydrogen, $C_{(1-8)}$ alkyl, $C_{(1-8)}$ alkoxy and halogen, D is selected from

or O, $X^1$ is selected from $R^3$ or

$Y^1$ is $R^5$ or
—$CH_2(CH_2)_n(OR^2)_3$,
$Q^1$ is
—$CH_2(CH_2)_nSi(R^1)_x(OR^2)_y$, $Z^1$ is

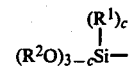

x is 0, 1 or 2, y is 1, 2 or 3, x+y is 3 and n is 0, 1 or 2, a and b are integers equal to 1 to 3 inclusive, a+b is equal to 3, and c is equal to 0 or 1.

Some of the silylated organic UV screen shown by formula (1) have a hydroxy benzophenone UV absorbing functional group and are shown by Ashby et al, U.S. Pat. No. 4,278,804, assigned to the same assignee as the present invention. The alkoxysilylacrylamides and malonates shown by formulas $1_{(ii)}$ and $1_{(iv)}$ are shown in my copending application Ser. Nos. 154,626 and 154,625, filed May 30, 1980 and assigned to the same assignee as the present invention. Some of the preferred silylated organic UV screens which can be utilized in the practice of the invention are 4-[γ-(triethoxysilyl)propoxy]-2-hydroxybenzophenone, 2-hydroxy-3-[γ-triethoxysilyl]-propylmethylphenylbenzotriazole, and [γ-triethoxysilyl]propyl-2-cyano-3,3'-diphenylacrylamide.

Additional silylated organic UV screens are shown in the aforementioned Ashby et al and Ching applications as well as methods for making such materials which are incorporated herein by reference. Additional silylated organic screens which can be used in the practice of the invention are

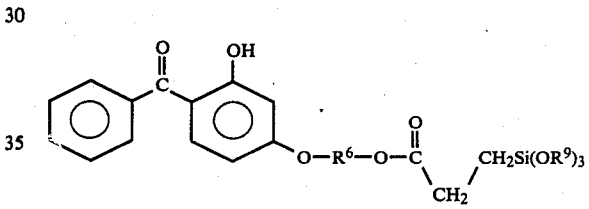

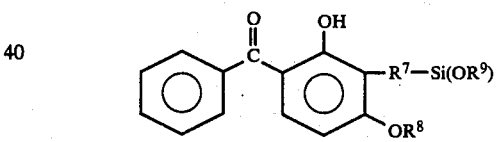

where $R^6$ and $R^7$ are divalent $C_{(2-4)}$ alkylene radicals and $R^8$ is selected from H and $C_{(1-8)}$ alkyl, and $R^9$ is a $C_{(1-3)}$ alkyl.

The silicone hardcoat composition which can be used in the practice of the present invention comprises a dispersion of colloidal silica in an aliphatic alcohol-water solution of the partial condensate of a silanol of the formula $RSi(OH)_3$, where R is selected from the group consisting of $C_{(1-3)}$ alkyl and $C_{(6-13)}$ aryl, at least 70 weight percent of the silanol being $CH_3SI(OH)_3$, said composition containing 10 to 50 weight percent solids, said solids consisting essentially of 10 to 70 weight percent colloidal silica and 30 to 90 weight percent of the partial condensate, said composition having a pH of from 3.5 to 8.0.

The silicone hardcoat composition which is applied onto the polycarbonate substrate after it has been treated with silylated organic UV screen can be prepared by hydrolyzing a trialkoxysilane or a mixture of trialkoxysilanes of the formula $RSi(OR')_3$, wherein R is as previously defined, and R' is $C_{(1-8)}$ alkyl radicals, in an aqueous dispersion of colloidal silica.

In a further aspect of the present invention there is also provided articles of manufacture comprising composites of an unprimed polycarbonate substrate having at least one surface coated in accordance with the method of the present invention as described above.

Suitable aqueous colloidal silica dispersions generally have a particular size of from 5 to 150 millimicrons in diameter. These silica dispersions are well known in the art and commercially available ones include, for example, those sold under the trademark of Ludox (DuPont) and Nalcoag (NALCO Chemical Co.). Such colloidal silicas are available as both acidic and basic hydrosols. For the purposes of this invention, basic colloidal silica sols are preferred. However, acidic colloidal silicas are also contemplated. In addition, it has been found that colloidal silicas having a low alkali content (e.g., $Na_2O$) yield a more stable coating composition. Thus, colloidal silica having an alkali content of less than 0.35% (calculated as $Na_2O$) is preferred. Moreover, colloidal silicas having average particle size of from 10 to 30 millimicrons are also preferred. A particularly preferred one for the purposes herein is known as Ludox LS, sold by DuPont Company.

In preparing the hardcoat composition, the aqueous colloidal silica dispersion is added to a solution of a small amount of alkyltriacetoxysilane or acetic acid in alkyltrialkoxysilane or aryltrialkoxysilane. If desired, small amounts of dialkyl dialkoxysilane also can be utilized in the reaction mixture. The temperature of the reaction mixture is maintained at about 20° C. to about 40° C. and preferably below 25° C. It has been found that in about six to eight hours sufficient trialkoxysilane has reacted to produce the initial two-phase liquid mixture to one liquid phase in which the now treated silica (i.e., treated by admixture with the trialkoxysilane) is dispersed.

In general, the hydrolysis reaction is allowed to continue for a total of about 12 hours to 48 hours, depending upon the desired viscosity of the final product. The more time the hydrolysis reaction is permitted to continue, the higher will be the viscosity of the product.

After hydrolysis has been completed, the solids content is adjusted by the addition of alcohol, preferably isobutanol, to the reaction mixture. Other suitable alcohols for this purpose include lower aliphatic alcohols such as methanol, ethanol, propanol, isopropanol, n-butyl alcohol and t-butyl alcohol. Mixtures of such alcohols can be used, too. The solvent system should contain from about 20 to 75 weight percent alcohol to ensure solubility of the partial condensate (siloxanol). Optionally, additional water-miscible polar solvents, such as acetone, butylcellosolve and the like in minor amounts, like no more than 20 weight percent of the cosolvent system, can also be employed.

The solids content of the coating composition used in the practice of the invention is generally preferred to be in the range of from about 18 to 25%, most preferably about 20%, by weight of the total composition consisting essentially of about 7% by weight colloidal silica, about 13% by weight of the partial condensate. The pH of the resultant reacted composition is in the range of from about 3.5 to 8.0, preferably from about 6.6 to about 7.8 or from 3.8 to 5.7. If necessary, dilute base, such as ammonium hydroxide, or weak acid, such as acetic acid, may be added to the composition to adjust the pH to the desired range.

If desired, polysiloxane polyether copolymers, disclosed in said copending U.S. application Ser. No. 964,911, which act as flow control agents, may optionally be added to the compositions hereinafter the hydrolysis is completed. Preferably, however, they may be added to the composition after the initial solids content has been diluted with alcohol. As indicated, the polysiloxane polyether copolymer acts as a flow control agent and thereby prevents flowmarks, dirtmarks, and the like, on the surface of the substrate to which the coating is subsequently applied. For the purpose of this invention, the polysiloxane ether copolymer may be employed in an amount of from about 2.5 to about 15% by weight of the total solids of the composition.

Most advantageous results may be achieved when the copolymer is utilized at about 4% by weight of the total solids. At these amounts, the polysiloxane polyether copolymer prevents marks on the substrate which impair visibility or are aesthetically detecting and has no significant deleterious effects on the otherwise good abrasion resistance, scribed adhesion, ultraviolet light resistance, moisture and humidity resistance of the coating. Moreover, the presence of the polysiloxane polyether copolymer additive is found to reduce the incidence of stress cracking in the hard coating.

The alkyltriacetoxysilane is used to buffer the basicity of the initial two liquid phase reaction mixture and thereby also temper the hydrolysis rate. While the use of alkyltriacetoxysilane is preferred herein, glacial acetic acid may be used in its place, as well as other acids such as organic acids like propionic, butyric, citric, benzoic, formic, oxalic and the like. Alkyltriacetoxy silanes wherein the alkyl group contains from 1-6 carbon atoms can be used, alkyl groups having from 1 to 3 carbon atoms being preferred. Methyltriacetoxysilane is most preferred.

The silanetriols, $RSi(OH)_3$, hereinbefore mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy isopropoxy and n-butoxy substituents which, upon hydrolysis generate the silanetriol and further liberate the corresponding alcohol. In this way, at least a portion of the alcohol content present in the final coating composition is provided. Of course, if a mixture of trialkoxysilanes is employed, as provided for hereinabove, a mixture of different silanetriols, as well as different alcohols, is generated. Upon the generation of the silanetriol or mixtures of silanetriols is the basic aqueous medium, condensation of the hydroxyl substituents to form

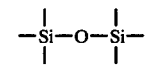

bonding occurs. This condensation takes place over a period of time and is not an exhausting condensation but rather the siloxane retains an appreciable quantity of silicon-bonded hydroxyl groups which render the polymer soluble in the alcohol-water cosolvent. It is believed that this soluble partial condensate can be characterized as a siloxanol polymer having at least one silicon-bonded hydroxyl group per every three

units.

The non-volatile solids portion of the coating composition herein is a mixture of colloidal silica and the partial condensate (or siloxanol) of a silanol. The major portion or all of the partial condensate or siloxanol is obtained from the condensation of $CH_3Si(OH)_3$ and, depending upon the input of ingredients to the hydrolysis reaction, minor portions of partial condensate can be obtained, for example, from the condensation of $CH_3Si(OH)_3$ with $C_2H_5Si(OH)_3$, or $C_3H_7Si(OH)_3$; $CH_3Si(OH)_3$ with $C_6H_5Si(OH)_3$, or even mixtures of the foregoing. For optimum results in the cured coating it is preferred to use all methyltrimethoxysilane (thus generating all monomethylsilanetriol) in preparing the coating compositions herein the partial condensate is present in an amount of from about 55 to 75 weight percent of the total solids in a cosolvent of alcohol and water, the alcohol comprising from about 50% to 95% by weight of the cosolvent.

The coating compositions of this invention will cure on a substrate at temperatures of, for example, 120° C. without the aid of an added curing catalyst. However, in order to employ more desirable milder curing conditions, buffered latent condensation catalysts can be added. Included in this class of catalysts are alkali metal salts of carboxylic acids, such as sodium acetate, potassium formate and the like. Amine carboxylates, such as dimethylamine acetate, ethanolamine acetate, dimethylaniline formate and the like, quaternary ammonium carboxylates such as tetramethylammonium acetate, benzyltrimethylammonium acetate, metal carboxylates, like tin octoate and amines such as triethylamine, triethanolamine, pyridine and the like are also contemplated curing catalysts herein. Alkali hydroxides, like sodium hydroxide and ammonium hydroxide can also be used as curing catalysts herein. Moreover, typical commercially available colloidal silica, especially those having a basic pH, contain free alkali metal base and alkali metal carboxylate catalysts will be generated in situ during the hydrolysis reaction herein.

The amount of curing catalyst can be varied within a wide range, depending upon the desired curing conditions. However, in general, catalyst in the amounts of from about 0.05 to about 0.5 weight percent, preferably about 0.1 weight percent, of the composition can be used. Compositions containing catalysts in these amounts can be cured on a solid substrate in a relatively short time at temperatures in the range of from about 75° C. to 150° C. to provide a transparent abrasion resistant surface coating.

The coating compositions of the present invention can be applied to a variety of solid substrates by conventional methods, such as flowing, spraying, or dipping, to form a continuous surface film. A hard coating having all of the aforementioned characteristics and advantages is obtained by the removal of the solvent and volatile materials. The coating composition will air-dry to a tack-free condition, but heating in the range of 75° C. to 200° C. is necessary to obtain condensation of residual silanols in the partial condensate. This final cure results in the formation of silsesquioxane ($RSiO_{3/2}$). In the finished cured coating the ratio of $SiO_{3/2}$ units to $SiO_2$ will range from about 0.43 to about 9.0, preferably 1 to 3. A cured coating having a ratio of $RSiO_{3/2}$ to $SiO_2$, when R is methyl, of 2 is most preferred. The coating thickness can be varied by means of the particular application technique, but coatings of about 0.5 to 20 microns, preferably 2–10 micron thickness are generally utilized.

In the practice of the invention a polycarbonate substrate, for example, a polycarbonate sheet is treated with a solution of the silylated UV screen of formula (1). The silylated UV screen solution can be prepared by hydrolyzing the silylated UV screen in a mixture of water as a water-miscible organic solvent, for example, butyl-cellosolve, acetonitrile, tetrahydrofuran, isopropanol, etc.

There can be utilized a proportion of about 5 to 95 parts of silylated UV screen per 100 parts of solvent which can consist of 5 to 95 parts of water-miscible organic solvent per part of water. A pH in the range of from about 3 to 10 can be used and preferably from 7 to 9. Hydrolysis temperatures which can be used are, for example, 0° C. to 50° C. It is preferred to use the hydrolyzed silylated UV screen within about 72 hours to avoid undue silanol condensation and precipitation of condensation product.

Initial treatment of the polycarbonate substrate can be effected by dipping or spraying the polycarbonate substrate with the solution of the silylated UV screen allowing the treated substrate to dry and thereafter heating it at a temperature of from 75° C. to 150° C. for 75 minutes to 180 minutes.

The hardcoat composition can then ben applied to the treated polycarbonate substrate by conventional methods such as flowing, spraying, or dipping to form a continuous surface film. After treatment with the hardcoat composition, the treated polycarbonate substrate can then be allowed to air dry to a tack-free condition and thereafter heated to a temperature in the range of from 75° C. to 200° C. to obtain condensation of the residual silanols in the partial condensate. The final cure results in the formation of a silsesqueoxane ($RSiO_{3/2}$). In the finished cured coating the ratio of $RSiO_{3/2}$ units to $SiO_2$ will range from abut 0.43 to about 9.0, preferably 1 to 3. A cured coating having a ratio of $RSiO_{3/2}$ to $SiO_2$, where R is methyl, of 2 is most preferred. The coating thickness can be varied by means of the particular application technique, but coatings of about 0.5 to 20 microns, preferably 2–10 micron thickness are generally utilized.

In order that those skilled in the art will be better able to practice the present invention, the following examples are given by way of illustration and not by way of limitation. All parts are by weight unless otherwise indicated.

EXAMPLE 1

In accordance with the procedure of Ashby et al, U.S. Pat. No. 4,278,804, there was prepared 4-[γ(triethoxysilyl)propoxy]-2-hydroxybenzophenone as follows:

There is added 10 drops of a 5% platinum vinyl-siloxane complex hydrosilation catalyst under nitrogen with stirring to a mixture of 5.08 grams of 4-alkoxy-2-hydroxybenzophenone and 3.28 grams of triethoxysilane in 100 ml of dry toluene. The solution becomes warm and the reaction is completed in ½ hour. Evaporation of the solvent at 50° C. under vacuum leaves a light yellow viscous oil containing traces of dark particles which are removed by filtration. There is obtained a 96% yield or 8.07 g of the above silylated organic UV screen which is confirmed by NMR and elemental analysis.

A solution of the silylated UV screen was prepared consisting of 15 parts of the silylated UV screen, 77.7 parts of butyl-cellosolve and 7.5 parts of water. Portions of the solution were hydrolyzed at 1, 3 and 5 days at ambient temperatures. The solutions were then adjusted to a pH of either 5.7 using acetic acid, or a pH of 8.3 using triethylamine.

Polycarbonate panels were washed with the various solutions and drip dried for ½ hour and heated at 125° C. for 1 hour. The treated panels were then flow coated with a curable silicone hardcoat composition. The silicone hardcoat composition was made as follows:

There is added 22.1 parts by weight of Ludox LS, silica sol (aqueous dispersion of colloidal silica, average particle size is 12 millimicrons, pH of 8.2 sold by du-Pont) to a solution of 0.1 parts by weight of methyltriacetoxysilane in 26.8 parts by weight of methyltrimethoxysilane. The temperature of the reaction mixture is maintained at 20° C. to 30° C., preferably below 25° C. The hydrolysis is allowed to continue for 24 hour. The solids content of the resultant reaction mixture is 40.5% and is diluted to about 20% solids with the addition of isobutanol. There is then added to 75 parts of the above silicone resin, 2.49 parts of 4-[γ(triethoxysilyl)propoxy]-2-hydroxybenzophenone and 0.6 part of SEF 1066 (polysiloxane polyether copolymer). The resulting mixture was thoroughly mixed and aged for 21 days. The final composition had a pH higher than 7.2.

The previously mentioned polycarbonate panels which were treated silylated with UV screen were then allowed to air dry for 30 minutes and cured for 1 hour at 125° C. The treted polycarbonate panels were then flow coated with the above hardcoat composition, air dried for 30 minutes and then cured at 120° C. for 1 hour. The resulting polycarbonate panels "A" were evaluated as described below.

Polycarbonate panels "B" were treated with a hardcoat composition as described above without being pretreated with a hydrolyzed solution of 4-[γ(triethoxysilyl)propoxy]-2-hydroxybenzophenone.

Polycarbonate panels "C" were also treated with unhydrolyzed silylated UV screen using the same organic solvents to dissolve the silylated UV screen followed by treating the polycarbonate panels after they were air dried with the hardcoat formulation. Polycarbonate panels "D" also were pretreated with 4-octyl-2-hydroxybenzophenone, Univul N-531 a product of the General Aniline and Film Company, and allowed to air dry followed by treatment with the silicone hardcoat formulation. Additional polycarbonate panels "E" were treated with silicone hardcoat formulation free of silylated UV screen.

The various treated panels were then measured for adhesion after being subjected to accelerated weathering by placing the treated polycarbonate panels in a QUV device, sold by the Q-Panel Company of Cleveland, Ohio, set to consecutive cycles of fluorescent UV light for 8 hours at 70° C., at 4 hours of high humidity at 50° C.

Adhesion testing of the resulting cured hardcoat was done by scribing the coated area with a Gitterschnitt-prufgeart cross-hatch cutter, applying Mystick 6432 tape to the cross-hatched area and rapidly pulling the tape from the cross-hatched area. Any coating removal by the tape constituted "Failure". The following results were obtained, where "hydrolyzed UV screen (days)" means pretreatment with hydrolyzed silylated UV screen and days of hydrolysis:

| Silicone-Polycarbonate Composite | pH of Silicone Hardcoat Sol. | Pretreatment With Silylated UV Screen | Silylated UV Screen Hydrolysis Time(days) | Adhesion QUV (hrs) Pass/Fail |
|---|---|---|---|---|
| A | 8.3 | yes | 1 | 1300/1400 |
|   |   |   | 3 | 1100/1200 |
|   |   |   | 5 | 70/150 |
| A | 5.7 | yes | 1 | 300/450 |
|   |   |   | 3 | 300/450 |
|   |   |   | 5 | 0/70 |
| B* |   | No |   | 600/700 |
| C | 7 | Yes | Not Hydrolyzed | 300/450 |
| D** |   | No |   | 300/400 |
| E |   | No |   | 0/48 |

*Contains silylated UV screen in silicone hardcoat
**Contains Univul N-531 in silicone hardcoat formulation The data in the above table shows that optimum results are obtained when the polycarbonate substrate is treated with the silylated UV screen after being hydrolyzed under basic conditions at room temperature for a period up to about 3 days. The polycarbonate panels coated directly with the hardcoat formulation free of silylated UV screen and without pretreatment of hydrolyzed silylated UV screen failed the QUV adhesion test within 48 hours.

Although the above example is directed to only a few of the silylated UV screens which can be employed in the practice of the present invention, it should be understood that the present invention is directed to the use of a much broader variety of UV screens which can impart improved weathering resistance to polycarbonate substrates treated with silicone hardcoat compositions when applied directly to the polycarbonate substrate as a hydrolyzate and followed by application of the silicone hardcoat composition in accordance with the practice of the present invention.

What I claim as new and desire to secure by Letters Patent of the United States is:

1. A method for making a composite of a polycarbonate substrate and a silicon hardcoat having improved weatherability which comprises,
    (1) treating a polycarbonate substrate with a solution of the hydrolysis product of a silylated organic UV screen which has been allowed to hydrolyze for a period not exceeding about three days and curing the applied hydrolyzate on the treated substrate at a temperature of from 75° C. to 150° C. and
    (2) applying onto the treated polycarbonate substrate a silicone hardcoat composition and thereafter heating the resulting composite to a temperature in the range of from 75° C. to 150° C. until the applied hardcoat composition is cured.

2. A method in accordance with claim 1, were the silylated organic UV screen has the formula,

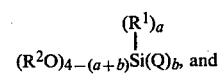

where $R^1$ is a $C_{(1-13)}$ monovalent hydrocarbon radical or substituted monovalent hydrocarbon radical, $R^2$ is a $C_{(1-8)}$ aliphatic organic radical selected from alkyl radicals, alkyl ether radicals, alkyl ester radicals, alkyl ketone radicals, alkylene radicals and $C_{(7-13)}$ aralkyl radicals, Q is selected from

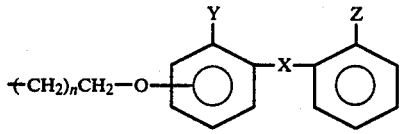
(i)

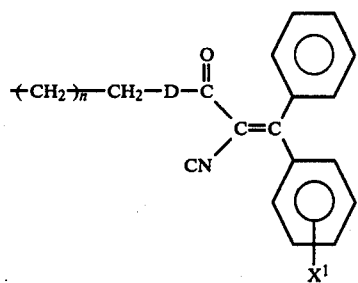
(ii)

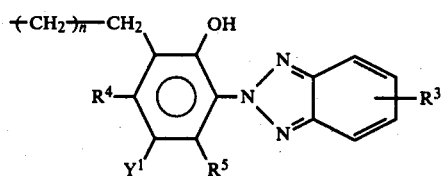
(iii)

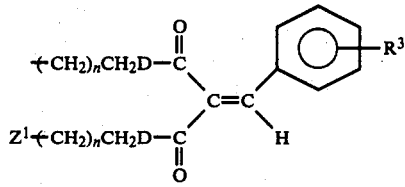
(iv)

Y is H or OH, Z is H, OH, $OQ^1$ or OM, where at least one Z is OH if Y is H, M is $C_mH_{2m+1}$ and m is an integer equal to 1 to 18 inclusive, X is selected from

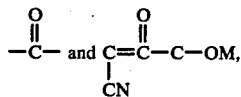

$R^3$ is a member selected from the class consisting of hydrogen, $C_{(1-8)}$ alkoxy, carboxy, halogen, hydroxy, amino, carbethoxy and $D\text{-}CH_2(CH_2)_nSi(OR^2)_3$, $R^4$ is a member selected from the class consisting of hydrogen, halogen, hydroxy, $C_{(1-8)}$ alkyl and $C_{(1-8)}$ alkoxy, $R^5$ is a member selected from the class consisting of hydrogen, $C_{(1-8)}$ alkyl, $C_{(1-8)}$ alkoxy and halogen, D is selected from —NH— or O, $X^1$ is selected from $R^3$ or

$Y^1$ is $R^5$ or
—$CH_2(CH_2)_n(OR^2)_3$,
$Q^1$ is
—$CH_2(CH_2)_nSi(R^1)_x(OR^2)_y$,
$Z^1$ is

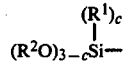

x is 0, 1 or 2, y is 1, 2 or 3, x+y is 3 and n is 0, 1 or 2, a and b are integers equal to 1 to 3 inclusive, a+b is equal to 3, and c is equal to 0 or 1.

3. A method in accordance with claim 1, where the silicone hardcoat comprises a dispersion of colloidal silica in an aliphatic alcohol-water solution of the partial condensate of a silanol of the formula $RSi(OH)_3$, where R is selected from the group consisting of $C_{(1-3)}$ alkyl and $C_{(6-13)}$ aryl, at least 70 weight percent of the silanol being $CH_3SI(OH)_3$, said composition containing 10 to 50 weight percent solids, said solids consisting essentially of 10 to 70 weight percent colloidal silica and 30 to 90 weight percent of the partial condensate, said composition having a pH of from 3.5 to 8.0.

4. A method in accordance with claim 1, where the silylated organic UV screen is 4-[γ(triethoxysilyl)-propoxy]-2-hydroxybenzophenone.

5. A polycarbonate silicone hardcoat composite made in accordance with claim 1.

* * * * *

UNITED STATES PATENT AND TRADEMARK OFFICE
CERTIFICATE OF CORRECTION

PATENT NO. : 4,395,461

DATED : Jul. 26, 1983

INVENTOR(S) : Ta-Yen Ching

It is certified that error appears in the above-identified patent and that said Letters Patent is hereby corrected as shown below:

Column 8, line 64, cancel "4-alkoxy-2-" and substitute -4-allyloxy-2--

Column 10, line 9, cancel "Hardcoat" and substitute -Pretreat-

Signed and Sealed this

Twenty-fifth Day of October 1983

[SEAL]

Attest:

GERALD J. MOSSINGHOFF

Attesting Officer

Commissioner of Patents and Trademarks